United States Patent [19]

Courtenay et al.

[11] Patent Number: 4,561,912
[45] Date of Patent: Dec. 31, 1985

[54] FLUXES FOR CASING METALS

[75] Inventors: John H. Courtenay, Solihull; Royston J. Phillips, Stourbridge, both of England

[73] Assignee: Foseco International Limited, Birmingham, England

[21] Appl. No.: 648,372

[22] Filed: Sep. 7, 1984

[30] Foreign Application Priority Data

Sep. 22, 1983 [GB] United Kingdom ............... 8325438

[51] Int. Cl.$^4$ ............................................. B23K 35/24
[52] U.S. Cl. ........................................ 148/23; 148/30
[58] Field of Search ................................ 148/23, 30

[56] References Cited

U.S. PATENT DOCUMENTS

| 3,052,936 | 9/1962 | Hamilton | 75/53 |
| 4,127,407 | 11/1978 | Eitel et al. | 75/53 |
| 4,462,823 | 7/1984 | Fontaine et al. | 75/53 |

FOREIGN PATENT DOCUMENTS

| 2614957 | 11/1978 | Fed. Rep. of Germany. |
| 2750061 | 10/1979 | Fed. Rep. of Germany. |
| 1575097 | 9/1980 | United Kingdom. |
| 2007633 | 5/1982 | United Kingdom. |

*Primary Examiner*—Veronica O'Keefe
*Attorney, Agent, or Firm*—Cushman, Darby & Cushman

[57] ABSTRACT

Fluxes for use in the casting of metals e.g. steel comprise granules containing carbonaceous powder in which the proportion of carbonaceous powder in the surface of the granules is greater than the overall proportion of carbonaceous powder in the granules. The fluxes are particularly suitable for use in the continuous casting of steel.

18 Claims, No Drawings

FLUXES FOR CASING METALS

The invention concerns fluxes for use in the casting of metals, especially ferrous metals e.g. steel, in particular for use in the continuous casting of steel.

In the continuous casting of steel it is common practice to apply a particulate flux to the top surface of the molten steel in the mould. The flux provides lubrication between the mould walls and the adjacent solidified layer of steel, it reduces the loss of heat upwards from the top surface of the steel in the mould, it protects that surface from oxidation and it may remove impurities from the steel.

In fluxes for the continuous casting of steel it is usual for a proportion of carbonaceous powder to be included in order to control the flux melting rate i.e. to reduce the rate to a level appropriate for the casting speed. The higher the casting speed is, the higher is the appropriate flux melting rate and the flux melting rate can be increased by reducing the proportion of carbonaceous powder. However, the presence of carbonaceous powder in the flux may promote fusion of the flux to form discrete droplets and inhibit sintering of the flux. If the flux sinters, there is a tendency for a rim, which is usually rather irregular, of sintered flux to be formed on the inner walls of the mould at the level of the molten steel meniscus and this phenomenon can lead to surface defects in the cast steel product. Moreover the presence of such a rim may in some cases lead to disruption in the smooth withdrawal from the mould of the solidifying steel skin and still liquid core, resulting in rupture of the skin, allowing the liquid core to drain out, this latter phenomenon being referred to as a break out. Accordingly, reduction of the proportion of carbonaceous powder in the flux in order to increase the flux melting rate e.g. for high speed casting can be accompanied by serious disadvantages.

It is known to make fluxes for the continuous casting of steel by first producing granules and then giving these a carbon black coating. In such granules the bonding of the carbon black to the core is weak and the carbon black tends to separate from the core as dust and contaminate the working environment. Moreover, loss of carbon black from the granules impairs the functioning of the flux and can lead to sintering of the flux. Loss of carbon black from the granules can result not only from physical separation but also from premature burning out of the carbon black and the fact that the carbon black is only weakly bonded to the core makes the granules prone to suffer the latter effect as well as the former one. The loss of carbon black from the granules tends to be a non-uniform phenomenon and therefore is liable to lead to irregular melting of the flux in addition to its other disadvantages.

According to the invention a flux for use in the casting of metals is in the form of granules of a composition containing carbonaceous powder, the proportion of carbonaceous powder in the surface of the granules being greater than the overall proportion of carbonaceous powder in the granules. That is, the granules have solid portions (e.g. are completely solid, or have a hollow center), and the proportion of carbonaceous powder in the surface of the granules is greater than the overall proportion of carbonaceous powder in the solid portions of the granules.

An advantage of fluxes of the invention is that benefits are obtained from the presence of the carbonaceous powder without dust problems arising from its presence and without the carbonaceous powder being prone to premature loss or destruction. It is a very significant feature of the fluxes of the invention that carbonaceous powder is present in the surface of the granules as an integral part of the granules as opposed to being present at the surface only as a weakly bonded, applied layer. The fact that the fluxes of the invention are in the form of coherent granules is advantageous both in terms of ease of handling and in terms of low dust levels.

A further advantage of the invention is that, by virtue of the presence of the higher proportion of carbonaceous powder in the surface of the granules than the overall proportion, fluxes can be provided which not only exhibit good flux properties but also contain relatively little carbon and thus are especially useful in cases where any pick-up of carbon from the flux by the steel is desired to be minimal, as is the case with low carbon steels.

It has also been found in accordance with the invention that, as a result of the carbonaceous powder being in a greater proportion in the surface of the granules than overall, it is possible to achieve a high melting rate suitable for high speed casting without incurring the serious disadvantages indicated above that arise when sintering of the flux occurs.

The granules may be generally solid or, preferably, contain a substantial proportion of void space. In the latter case the granules may be of hollow, generally spherical form or may be of generally spherical form with a cellular structure.

The fluxes of the invention may be made by a process comprising forming liquid-containing particles containing the flux ingredients, including carbonaceous powder, and evaporating e.g. by heating, the liquid e.g. water from the particles to yield granules in which the proportion of carbonaceous powder in the surface is greater than the overall proportion.

The fluxes of the invention are preferably made by forming a slurry, preferably aqueous, of the flux ingredients, including carbonaceous powder, and spray drying the slurry to form the flux granules. It is preferred that the carbonaceous powder should be substantially elemental carbon e.g. carbon black or should contain a very high proportion of carbon. In accordance with the invention it has been found that slurry compositions can be made which, on being spray dried, yield granules in which the carbonaceous powder migrates towards the surface during the drying. This is a very surprising phenomenon having the regard to the insolubility and general inertness of the carbonaceous powders as described above.

The migration of the carbonaceous powder is promoted by the presence of organic binder and for this reason the flux ingredients preferably contain such a binder such as starch. The proportion of organic binder is preferably 0.1 to 2.0% by weight.

In order to enhance the strength of the granules it is preferred that an inorganic binder e.g. sodium carbonate, sodium silicate or sodium phosphate should be present and the proportion is preferably 0.5 to 6% by weight.

The overall proportion of carbonaceous powder in the flux is preferably 0.2 to 8%, especially 0.5 to 3%, by weight, as such proportions, in view of the surface concentration phenomenon, have been found in accordance with the invention to enable a useful range of melting rates to be achieved satisfactorily and in particular to enable melting rates suitable for high speed casting to be achieved without permitting problematical sintering of the flux.

It is greatly preferred that part or all of the carbonaceous powder should have a particle size not greater than 0.05 microns. In particular it is preferred that 0.2 to 2% by weight of such carbonaceous powder should be present in the granules.

The chief ingredient or ingredients of the flux may be as in known fluxes. As in known fluxes, the chief ingredients may comprise a plurality of oxides especially calcium oxide, silicon dioxide, aluminum oxide, sodium oxide and potassium oxide and the oxides may be present in combined form as minerals or synthetic materials. For example, calcium oxide and silicon dioxide in combined form may be provided as calcium silicate e.g. synthetic wollastonite and sodium oxide and silicon dioxide in combined form may be provided as a soda/silicate glass. Amorphous calcium silicate is an example of a combined oxide material especially suitable as the chief ingredient of fluxes of the invention. The fluxes of the invention may also contain inorganic fluorides e.g. sodium fluoride.

The fluxes of the invention are particularly useful in the continuous casting of steel, especially in the case of high speed casting i.e. at a rate of 1.2 M/minute or higher and a further aspect of the invention is a method of continuously casting steel in which a flux of the invention is used. Advantages of the fluxes are not limited to cases where the fluxes are used in high speed casting and the fluxes are particularly valuable, even for casting at ordinary speeds, in the case of medium carbon steels which, ordinarily, are especially prone to longitudinal crack problems.

The following is an example of the composition of a flux of the invention:

| Ingredient | parts by weight |
|---|---|
| amorphous calcium silicate | 64 |
| soda/silicate glass powder | 18 |
| sodium fluoride | 13 |
| carbon black | 0.5 |
| coke dust | 2 |
| starch | 0.5 |
| sodium carbonate | 4 |

The above composition was formed into an aqueous slurry and spray dried to give a flux of the invention in the form of hollow, generally spherical granules. The density of the product was 0.86 g/cc. The flux was substantially dust free and the granules had a shiny black surface but appeared gray when crushed, this phenomenon providing a visual indication of the greater concentration of the carbonaceous powder in the surface of the granules than in the overall composition. The flux was suitable for use in the high speed continuous casting of steel.

A further example of the composition of a flux of the invention is as follows:

| Ingredient | parts by weight |
|---|---|
| amorphous calcium silicate | 65 |
| soda/silicate glass | 16.7 |
| sodium fluoride | 10 |
| carbon black | 1.5 |
| coke dust | 0.5 |
| starch | 0.5 |
| sodium carbonate | 6 |

The above composition can be formed into an aqueous slurry and spray dried to give a flux in the form of hollow, generally spherical granules with a greater concentration of the carbonaceous powder in the surface of the granules than in the overall composition. Such a flux is suitable for slow to medium speed continuous casting of steel and the relatively low total carbon content significantly reduces the risk of carbon pickup by the steel as compared with that if conventional fluxes were used.

We claim:

1. A flux, for use in the casting of metals, in the form of granules of a composition containing carbonaceous powder in solid portions of the granules, the proportion of carbonaceous powder in the surface of the said granules being greater than the overall proportion of carbonaceous powder in the solid portions of the granules.

2. A flux according to claim 1 in which the granules are of hollow, generally spherical form, the solid portions surrounding a void space in the center of each of the particles.

3. A flux according to claim 1 in which the granules contain an organic binder.

4. A flux according to claim 3 in which the proportion of organic binder in the granules is 0.1 to 2.0% by weight.

5. A flux according to claim 1 in which the granules contain an inorganic binder.

6. A flux according to claim 5 in which the proportion of inorganic binder in the granules is 0.5 to 6% by weight.

7. A flux according to claim 1 in which the overall proportion of the carbonaceous powder in the granules is 0.2 to 8% by weight.

8. A flux according to claim 7 in which the proportion of the carbonaceous powder in the granules is 0.5 to 3% by weight.

9. A flux according to claim 1 in which at least part of the carbonaceous powder has a particle size not greater than 0.05 microns.

10. A flux according to claim 9 in which the granules contain 0.2 to 2% by weight of carbonaceous powder, the powder having a particle size not greater than 0.05 microns.

11. A flux according to claim 1 wherein the granules are generally solid.

12. A flux according to claim 1 wherein the granules are of generally spherical form with a cellular structure.

13. A flux according to claim 2 in which the overall proportion of the carbonaceous powder in the granules is 0.2 to 8% by weight.

14. A flux according to claim 11 in which the overall proportion of the carbonaceous powder in the granules is 0.2 to 8% by weight.

15. A flux according to claim 12 in which the overall proportion of the carbonaceous powder in the granules is 0.2 to 8% by weight.

16. A flux according to claim 2 in which the granules contain 0.2 to 2% by weight of carbonaceous powder, the powder having a particle size not greater than 0.05 microns.

17. A flux according to claim 11 in which the granules contain 0.2 to 2% by weight of carbonaceous powder, the powder having a particle size not greater than 0.05 microns.

18. A flux according to claim 12 in which the granules contain 0.2 to 2% by weight of carbonaceous powder, the powder having a particle size not greater then 0.05 microns.

* * * * *